United States Patent [19]
Bomar, Jr.

[11] 3,720,911
[45] March 13, 1973

[54] MOTOR VEHICLE IDENTIFICATION AND SPEED CONTROL SYSTEM

[76] Inventor: Troy W. Bomar, Jr., 1015 Parkside Drive, Wilmington, Del. 19803

[22] Filed: June 15, 1971

[21] Appl. No.: 153,278

[52] U.S. Cl. .............................. 340/52 F, 340/224
[51] Int. Cl. ............................................. G08b 29/00
[58] Field of Search ...... 340/22, 32, 38, 52 F, 53, 62, 340/63, 224, 263, 408, 416

[56] References Cited

UNITED STATES PATENTS 3,203,501  8/1965  Carter et al. ..................... 340/53 X
3,024,443  3/1962  Barker et al. ..................... 340/62 X

*Primary Examiner*—Alvin H. Waring
*Attorney*—Arthur Schwartz et al.

[57] ABSTRACT

A mobile transmitter/receiver in each motor vehicle and each including a unique identification signal. One or more base stations including a receiver and transmitter which includes means to ascertain the unique identification number of a given vehicle at a given place and time. Systems are provided for ascertaining, along with the identification of the vehicle; its speed or if it is stolen, conditions such as if the vehicle is polluting the air or other maintenance problems; if the driver is intoxicated or has not fastened his seat belt. Also, the same system may be used in signalling the occurrence of an accident or other emergency situation; controlling entry into limited access areas, together with "operating" toll stations in parking lots, on toll roads, bridges, etc.

10 Claims, 6 Drawing Figures

MOBILE RECEIVER / TRANSMITTER

MOBILE RECEIVER / TRANSMITTER

INVENTOR
TROY W. BOMAR, JR.

BY
*Arthur Schwartz*
ATTORNEY

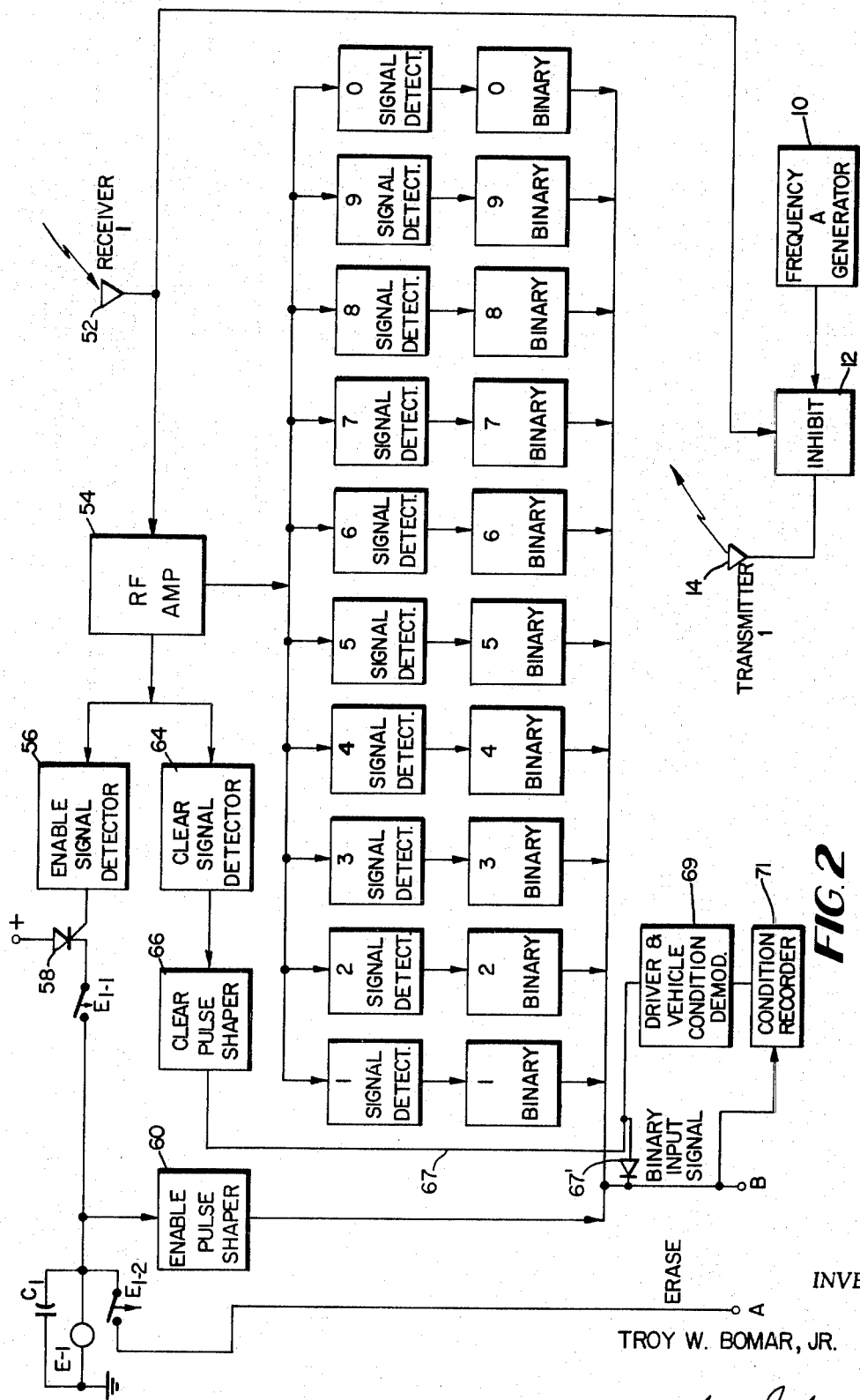
FIG. 2 BASE STATION #1

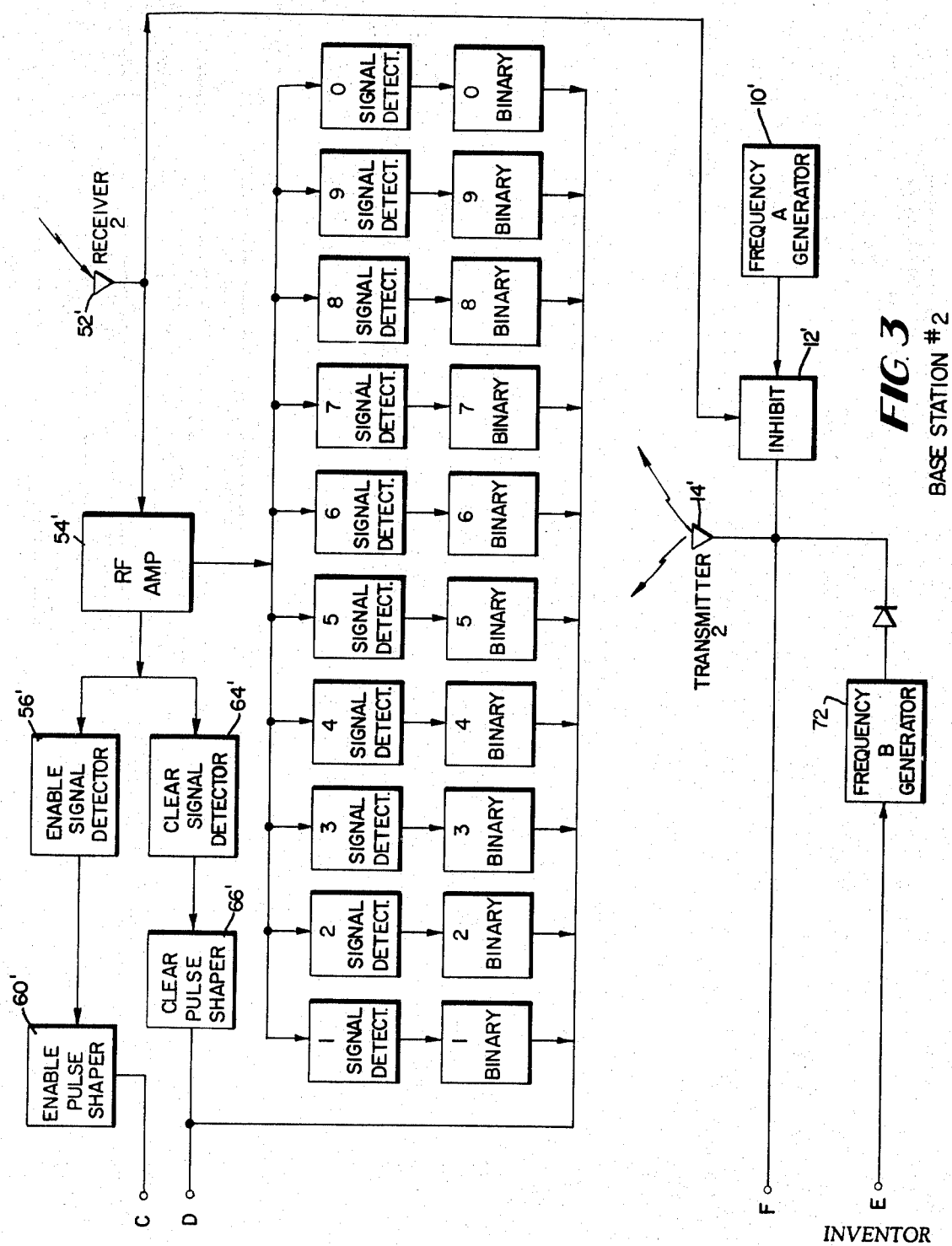

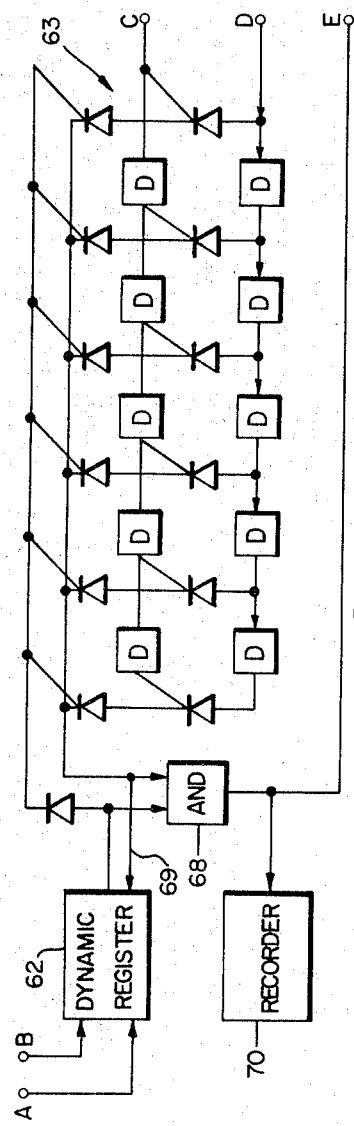
FIG. 4 BASE STATION RECORDER
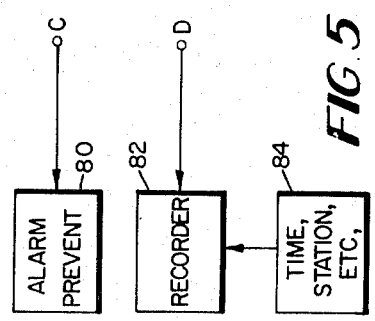
FIG. 5 TOLL STATION RECORDER
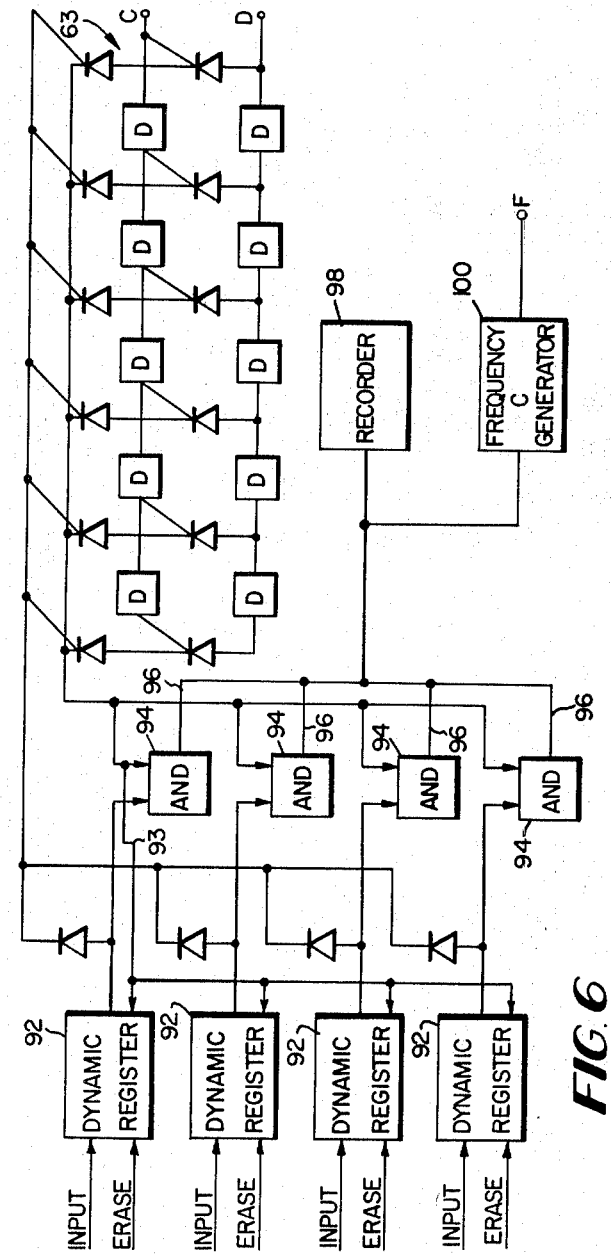
FIG. 6 STOLEN CAR TRACKING
INVENTOR
TROY W. BOMAR, JR.
BY Arthur Schwartz
ATTORNEY

MOTOR VEHICLE IDENTIFICATION AND SPEED CONTROL SYSTEM

BACKGROUND OF THE INVENTION

1. Field of the Invention

The invention relates to a system for providing specific, active identification of motor vehicles which may be used for vehicle speed control, as well as such areas where the specific identification of the vehicle is desired.

2. Prior Art

In the prior art of motor vehicle speed control, the most commonly used approach is police operated radar stations, commonly referred to as "speed traps." Normally, a radar station is set up along the road, either on a tripod or in a vehicle which is to a greater or lesser degree obvious to the motorist. Secondly, positioned a distance away along the highway must be a second station with one or more police officers to flag the alleged speeder off the roadway and prepare a summons. This approach has a number of additional disadvantages in that it requires one or more manned stations, it is quite time consuming, and in itself can cause a traffic hazard as the policeman quite often must go out on the highway to flag a particular car over to the side of the road. There is also an actual possibility of an accident occurring due to the sudden stopping or slowing down of the vehicles. Further, since the original manned radar station is again, to some degree obvious, would-be speeders may merely watch for the radar station and only bring their speed within specified limits when the radar unit is observed.

The radar method, as well as a number of other systems have the additional disadvantage of not providing a specific identification of the vehicle.

Other devices have been provided whereby the speed of a vehicle is determined internally by such means as a connection to the speedometer cable or a governor which will transmit via radio waves the speed of the vehicle to a receiver positioned external to the vehicle. Again, the disadvantage here is that there is no specific identification of the vehicle itself.

In the area of vehicle identification systems per se, there have been numerous approaches proposed. A combination of vehicle identification and speed measurement has been illustrated in U.S. Pat. No. 3,546,696 to Waters et al. This system is extremely complex and limited in utility in that it includes an antenna buried near the start-finish line of a raceway and signals each car as it passes thereover. The transponder on each car radiates a unique signal which is picked up by a directional antenna. The signal is fed to a computer which will then indicate to those exterior of the vehicle the speed of the racing car as well as a number of other items of interest. Also in an alternative embodiment, the patent proposed that each vehicle contain a transmitter, and the antenna at the start-finish line be used in conjunction with a receiver. As will be seen from the detailed discussion of the invention set out below, the instant invention is much simpler in operation and has a much broader scope of use than that set out in the prior art.

A great body of prior art exists dealing with the use of photoelectric and transponder type devices in vehicle identification systsm, primarily in the railroad car environment. These are of extremely limited use in that the motor vehicles traveling on a highway do not follow an exact path which the railroad car does as it rolls on the track. Therefore, the same relation between a motor vehicle and the outside interrogator is not present.

It is customary on toll roads, tunnels and bridges for a toll station to be positioned to collect the prescribed amount for the particular type of vehicle. The most common type has an attendant who collects money and makes change, thus permitting the vehicle to pass through. If the driver has the correct change, he may slow down or stop by a "basket" and toss the money into a collecting device. The device compares the money deposited with the prescribed amount and either signals the vehicle to go on or raises a toll gate. In further automation of this procedure such prior art as Gran U.S. Pat. No. 3,231,854 has included a system wherein a vehicle generates a beam such as from an ultrasonic generator and is permitted to pass through the toll booth. A toll fee or the like is registered in a locked compartment within the vehicle. This prior art type of device does not provide for externally recording the vehicle's identification and fee for passage through the toll area.

SUMMARY AND OBJECTS

One of the objects of the instant invention is to provide a specific identification generator within a vehicle, wherein a unique identification signal may be transmitted by radio waves to a receiving station from each vehicle. The transmitted signal is received by a fixed station which provides an unambiguous identification of the vehicle.

A further object is to utilize the identification for speed measuring and general law enforcement relative to vehicle control.

Another object of the invention is to provide a device which may be used for billing purposes in conjunction with toll boothes on toll roads, tunnels and bridges without requiring the vehicle to stop or even reduce speed.

A further object is to provide an easy method of billing for unattended garages, parking lots and the like.

Still another object is to provide a means of monitoring various vehicle and driver conditions such as whether or not a given vehicle is contributing to the pollution of the air by emitting undesirable gases. Other situations which may be monitored are vehicle maintenance conditions, driver intoxication, seat belt connections, or actual vehicle speed as determined by the speedometer.

Another object is to provide for the tracking and identification of stolen vehicle.

A further object is to provide a device which can be used in controlling the entry into limited access areas, such as military reservations or industrial complexes. In such an installation, the identification number of each vehicle permitted entry will be compared by a computer with that vehicle desiring entry.

Another object is to provide an emergency warning signal to the vehicle if excessive speed by that vehicle is causing an immediate danger to the vehicle (e.g., a dangerous curve, conditions of poor visibility, etc.)

Another object is to give an indication of an immediate danger to all vehicles, regardless of speed, such as where an accident has occurred. In this case, the damaged vehicle would transmit an emergency signal.

Another purpose of the invention is to provide a system used in conjunction with such of the above areas as speed control and toll or other fee collection whereby the device may be incorporated with a billing system. The output from the toll booth station or the like can be stored in a recorder for later processing or can immediately be relayed over a telephone line to a central computer or clearing house which will periodically bill the owner of the vehicle, thereby speeding up the motorist's trip and not requiring him to carry miscellaneous amounts of change.

Another object is to provide the driver with an immediate indication of a possible violation for example, with regard to speed control and other vehicle or driver monitoring situations, as the motorist passes the control station. A signal can be fed back to him indicating that he is traveling at an excessive speed or for example, the pollution coming from his vehicle is above the predetermined amount. Since his violation is also recorded, he may subsequently receive by mail a summons or a notice telling him that he should have his emission system corrected.

The invention is directed to a system having a device in a vehicle which generates a unique identification signal, as well as an "Enabling" signal, an emergency signal, and signals indicating driver or vehicle conditions. These signals are used in the following broad environments:

1. Speed Control: A Base Station sends an inquiring signal to the vehicle which generates its identification signal if another vehicle in the vicinity is not generating its own enabling signal. A second Base Station records the identification signal if the vehicle travels between the two Base Stations faster than a predetermined time.

2. Toll Station: A toll station has a recorder which records the vehicle's identification signal and other data as it passes through. The "Enabling" signal is used to prevent an alarm from sounding as the vehicle passes.

3. Limited Access Areas: A Base Station includes a register of identification signals corresponding to vehicles permitted access. As the vehicle approaches, its identification signal is compared with those recorded. If there is a "match," the vehicle is permitted entry.

4. Emergencies: Each vehicle is provided with means for generating an Emergency signal in case of an accident, etc. This signal is detected by each vehicle within a given area, and a light flashes to tell the driver to be prepared for an emergency situation along the highway.

5. Stolen Car Identification: Law enforcement officials are provided with means for generating a signal to compare the identification signal of a vehicle with a recorded listing of stolen vehicles.

6. Vehicle and Driver Condition Monitor: Each vehicle may be provided with means for generating an identification signal together with a modulated signal if a certain vehicle or driver situation occurrs.

BRIEF DESCRIPTION OF THE DRAWInGS

The above other objects will become apparent by reference to the specification and drawings wherein:

FIG. 2 is a schematic diagram of a first Base Station in accordance with the invention;

FIG. 3 is a schematic diagram of a second Base Station in accordance with the invention;

FIG. 4 is a schematic diagram of the Base Station recorder;

FIG. 5 is a schematic diagram of a toll station recorder; and

FIG. 6 is a schematic diagram of a stolen car tracking network.

DETAILED DESCRIPTION OF THE DRAWINGS

1a. SPEED CONTROL SYSTEM

Figure 1:
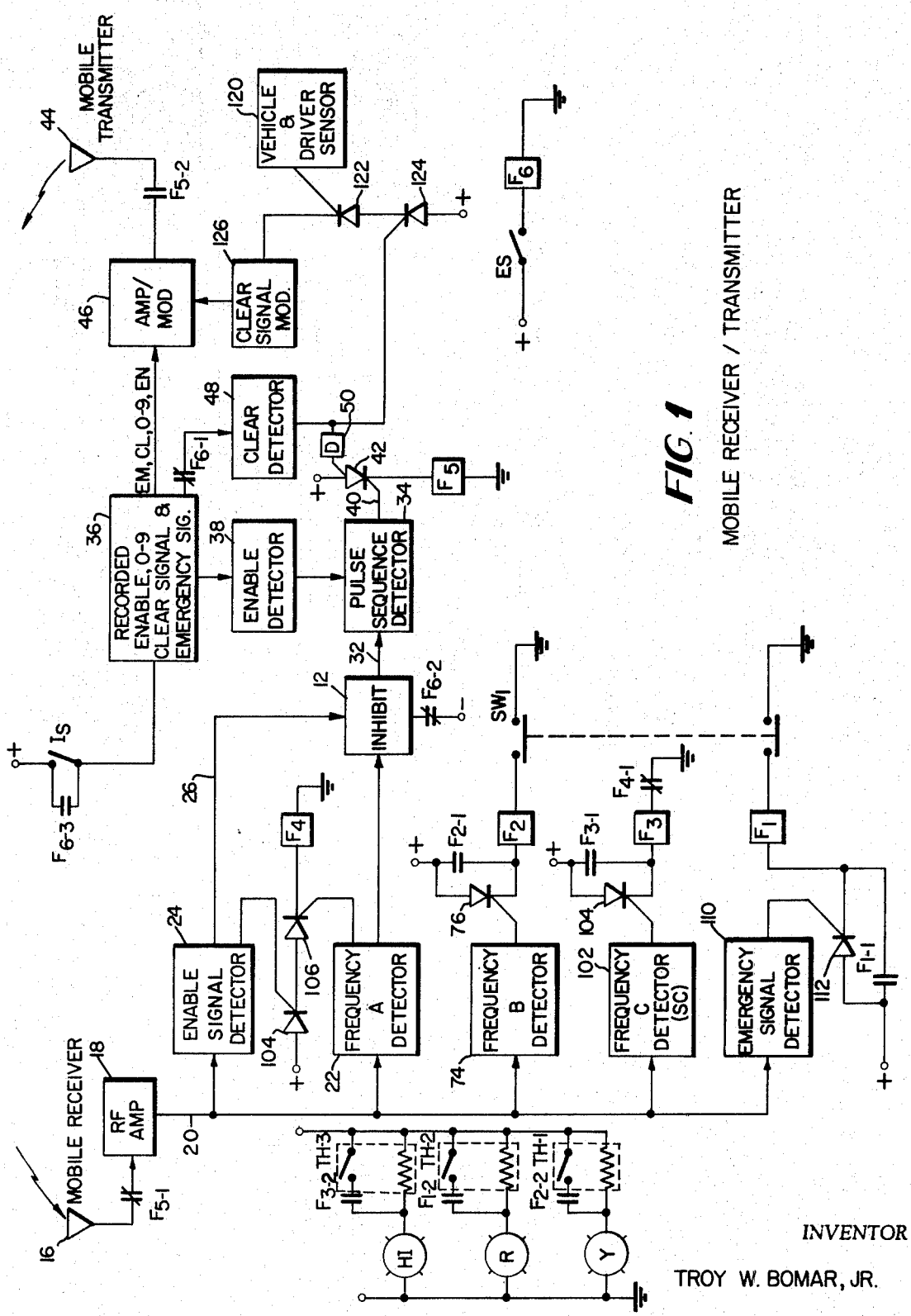
FiG. 1 is a schematic diagram of a mobile receiver/transmitter on a vehicle which transmitts that vehicle's identification number and other signals.

In the Speed Control System specific reference will be made to FIGS. 1–4. A generater 10 at Base Station No. 1 in FIG. 2 transmitts an inquiring Frequency A through an open inhibitor 12 to a transmitting antenna 14. The Frequency A is received in FIG. 1 over a mobile receiver antenna 16 and passes through a normally closed switch F5–1 to an RF amplifier 18. The signal, which is picked up and amplified, is transmitted then over line 20 to a Frequency A Detector 22.

As will be discussed below each vehicle has means for generating an Enable Signal prior to generating its identification signal. So that two vehicles will not be transmitting their identification signal at the same time, each is equipped with an Enable Signal Detector 24 which can receive an Enable Signal from any other vehicle through receiver antenna 16, amplifier 18 and line 20. If the Enable Signal has been received, a signal will be sent out over a line 26 from the Enable Signal Detector 24 to the inhibitor 12. If the inhibitor 12 is in its inhibiting condition, no signal will be able to pass through the inhibitor 12 to Frequency A Detector 22. If there is no Enable Signal to inhibit the signal from detector 22, it will pass through the inhibitor 12 over a line 32 to a Pulse Sequence Detector 34.

On a disc or other recording medium 36 are coded an Enable Signal, an identification signal representing the digits 0–9 arranged to form a particular number such as a license plate number, a Clear Signal and an Emergency Signal. This recording is always "on" and rotating under a playback head when an ignition switch IS is closed. When the Enable Signal from the recorder 36 is detected by an Enable Detector 38, the recorded Enable Signal is transmitted to the Pulse Sequence Detector 34. If there is a Frequency A on line 32, a signal will be generated on a gate element 40 of a controlled diode 42. When the controlled diode 42 is gated on, the relay F5 will be closed. When relay F5 is closed, the normally closed contacts F5–1 on the mobile receiver are opened; and the normally opened contacts F5–2 on a transmitter antenna 44 will be closed, thus placing the device in the transmit mode. While the device is transmitting, the receiver can receive no more external signals since the normally closed contacts F5–1 have been opened. This will set up a circuit so that the recorded Enable, Digit, Clear, and Emergency signals can all appear at an amplifier/modulator 46. As will be seen immediately below, the recorded Enable Signal, Digit Signals and the Clear Signal are transmitted while the Emergency Signal is prevented from being transmitted. This is because as soon as the Clear Signal is detected on a Clear Signal Detector 48 through normally closed contacts F6-1, the controlled diode 42 is back biased "off" through an appropriate delay 50 which opens contacts F5-2. The delay is built in to make sure that the Clear Pulse doesn't turn off the transmitter before the pulse gets through the transmitter.

Actually, while two antennas are shown for ease in explanation, the device in its best mode includes a common antenna with relay F5 regulating whether it is in the "Transmit" or "Receive" mode.

Referring back now to FIG. 2 and Base Station No. 1, the signals emanating from the transmitting antenna 44 are received on a receiving antenna 52 on Base Station No. 1. These signals are amplified in an RF amplifier 54. The portion of the signal corresponding to the Enable Signal is detected in an Enable Signal Detector 56 which gates on a controlled diode 58. The diode in turn brings timed relay E1 into the circuit which opens contact E1-1 to prevent any other signals from being received for a predetermined length of time.

The Enable Pulse is then applied through an Enable Pulse Shaper 60 and sent as the first part of this signal to a Dynamic Register 62 (See FIG. 4). The digit signals are detected since each signal is either represented by an individual frequency or by an individual train of pulses or a pulse code. The digit signals are detected in the order they are received through the series of Signal Detectors (1-0) and then converted into a binary number (1-0). Therefore, the signal includes an Enable Pulse, the binary signal representing the license plate number and a Clear Signal which is derived from the receiver 52, via RF amplifier 54 to a Clear Signal Detector 64 and a Clear Pulse Shaper 66 through a diode 67'. The various signals "exit" FIG. 2 at terminal B, thus appearing at the Dynamic Register 62 in FIG. 4. The signals are stored and continue to circulate in the Dynamic Register in the form of a circulating pulse until the pulse is erased; that is, until the Dynamic Register receives at terminal A an erase pulse. When the erase pulse is received, the specific number stored therein will be wiped out, and the register will be set up to record another number.

Illustrated in FIG. 3 is Base Station No. 2 which is positioned down the highway from Base Station No. 1. Base Station No. 2 is also transmitting a Frequency A from Frequency A Generator 10' in the same manner as that set out in Base Station No. 1 (FIG. 2). Similar elements have been given the same numbers with a "-prime" affixed thereto.

The signals follow through the circuitry in Base Station No. 2 as in Base Station No. 1. The Enable signal "exiting" from terminal C enters the Base Station Recorder of FIG. 4 on terminal C. Thus, the Enable Signal is received on 52', amplified at 54', detected at 56', and shaped at 60'. The signal is then fed from the Pulse Shaper 60' into a conventional Delay Line network 63 in FIG. 4 via terminal C. The delay lines are actually a series of two delay lines including a plurality of controlled diodes. The second delay line enters the Base Station Recorder on terminal D (FIG. 4) from terminal D of FIG. 3. The signals coming in over terminal D include the signals in the form of binary coded data coming from the Signal Detectors and the shaped Clear Signal from Detector 64' and Shaper 66'.

The need for a Delay Line is because the signals coming from Base Station No. 2 arrive at random times. The number in the Dynamic Register 62 received from the Base Station No. 1 is also random. Therefore, delay lines are needed so that a coincidence can be obtained between the identification number received from the first and second Base Stations. What happens is that the Enable Signal precedes the identification number received at Base Station 2. The Enable Signal then precedes the identification number down through the Delay Lines so that when a coincidence of the Enable Signal from Base Station No. 1 and Base Station No. 2 on the two controlled diodes in series is obtained, a transmission is immediately obtained through the diodes of the identification number from terminal D going into the AND circuit 68. The Dynamic Register 62 is also pulsed over line 69 to cause transmission of the signal contained therein to the AND circuit. The basic principal of the AND circuit is that if two like signals are received, an output is obtained. Therefore, if there is a coincidence of the two numbers, an output equivalent to that number is obtained from the AND circuit 68.

It should be pointed out that a given number is held in the Dynamic Register 62 from Base Station No. 1 for a period of time. The time is selected and set in the Dynamic Register based upon the distance between the two Base Stations and the legal speed limit.

The time is set on the timed relay E1. The timed relay is set for the amount of time that it should take to go from Base Station No. 1 to Base Station No. 2, when traveling at the legal speed. Therefore, if the vehicle reaches Base Station No. 2 faster than the predetermined set time, the number will remain in the Dynamic Register, and there will be a match in the AND circuit. If the vehicle arrived at or below the correct speed, then the relay contact E1-2 would close and the capacitor C1 will be discharged. An Erase Signal will be sent down through terminal A, entering FIG. 4 and sending an Erase pulse to the Dynamic Register 62 wiping out the identification number. When this occurs, contact E1-1 closes which resets Base Station No. 1 for another Enable pulse to come through.

The relay discussed above probably would be a pneumatic type or a solid state delay which could be easily and accurately varied.

The distance between the two Base Stations can actually be quite close since it only takes about 17 micro seconds to transmit a 10 decimal digit binary number.

Assuming there is a match in the AND circuit 68, the identification number would then be recorded in a Recorder 70. This is a permanent recorder such as magnetic tape or the like. At the same time a pulse will be sent from the AND circuit through terminal E to a Frequency B Generator 72 at Base Station No. 2. This Frequency B or speeding signal is sent out over transmitter 14' and arrives at receiving antenna 16 on the mobile receiver/transmitter of FIG. 1. It passes through closed contact F5-1, through RF Amplifier 18, over line 20 to a Frequency B Detector 74. This will in turn key-on controlled diode 76 energizing a relay F2. Contact F2-1 will be closed thus latching the relay on. Contact F2-2 will also close to energize a flashing yellow light Y which is caused to flash by means of a thermal relay TH-1. This light will continue to flash until the driver pushes a switch SW1 which will drop out the relay F2 and turn off the light. Obviously, this light serves to notify the driver that he has been speeding and that his number has been recorded in the Base Station Recorder.

1b. OPERATION OF SPEED CONTROL SYSTEM

Briefly, the speed control system operates as follows:

When the motorist enters his car and turns on the ignition switch IS, the various information recorded in recorder 36 begins "playing." This information includes, among other things, the vehicle identification number. When the vehicle goes down the road and passes Base Station No. 1 which is transmitting a frequency A from generator 10 through the transmitter antenna 14, the signal is picked up on the mobile receiver antenna 16 and passes through the Frequency A Detector 22. If another vehicle is emitting an Enable Signal, this is picked up in the same manner through detector 24, and the signal from the Frequency A Detector 22 is inhibited from passing on to a Pulse Sequence Detector 34. However, if the situation is clear, the Frequency A Detector 22 sends a signal through to the Pulse Sequence Detector 34. When the Enable signal appears through the Enable Detector 38 at the Pulse Sequence Detector, controlled diode 42 will be energized, closing the relay F5. This will open the contact F5-1 and close the contact F5-2. Thus, the Enable Signal and the identification number (0-9) will be transmitted from the mobile transmitter antenna 44.

The signal emanating from the transmitter 44 will be received on the Base Station receiver 52. The various information will also be received at the antenna 52' at Base Station No. 2 at a predetermined later time. The data including the Enable Signal, Clear Signal and identification number will be placed in the Dynamic Register 62. The identification number will be continuously available for output from the Dynamic Register 62 to the AND circuit 68. Depending upon when the information is received at Base Station No. 2 over lines C and D through the delay lines will control whether or not the vehicle's identification number is permanently recorded in the recorder 70 for subsequent action.

If the number is recorded, a signal passes over terminal E to the Frequency B generator 72. The driver is then notified he is speeding by the flashing yellow light Y by means of the signal picked up on receiver 16 and passing through the Frequency B Detector 74 and energizing relay F2.

2. STOLEN CAR IDENTIFICATION AND TRACKING

For the stolen car identification system, it is assumed that each car is equipped with its own identification number as discussed above. Very simply, the Base Station Recorder connected to a central computer or an independent station which may be in a police cruiser car or along the road, has all of the stolen car identification numbers in a series of Dynamic Registers. The Base Station is generating a Frequency A. Since the car has picked up the Frequency A (and assuming there has been no Enable Signal generated by another car), the vehicle in question will be transmitting its own Enable Signal as well as its identification number. This will be picked up through Base Station No. 2, and will "exit" FIG. 3 on terminals C and D. Referring to FIG. 6, which has terminals C, D and F operating in conjunction with Base Station No. 2 terminals C, D and F, the Enable Signal comes through a series of delay lines via terminal C. The delay lines operate in the same manner as discussed in FIG. 4. The number of Dynamic Registers 92 will depend upon the number of stolen cars. The Dynamic Registers 92 will be pulsed on by means of line 93 coming out of the Delay Line. The Dynamic Registers 92 will then output the numbers therein into their corresponding AND circuits 94. Coming over terminal D will be the vehicle's own identification number. If there is a "match" in the AND circuit 94, an output from this circuit will appear on its corresponding output line 96. The output over line 96 will be permanently recorded in a recorder 98 to record the time and passing of the particular station. Also keyed-on will be a Frequency C Generator 100. The Frequency C Generator 100 sends its appropriate signal out over terminal F which enters Base Station No. 2 over terminal F in FIG. 3. The transmitter 14' at Base Station No. 2 will transmit Frequency C. The Frequency C is then received on the Mobile Receiver 16 and fed through the RF Amplifier 18 down line 20 to a Frequency C Detector 102. The signal emanating from the Frequency C Detector 102 gates on a controlled diode 104 which energizes relay F3 closing contact F3-1 latching it on. Further, contact F3-2 is closed energizing a high intensity light HI which is visible exterior to the vehicle. A thermal relay TH-3 will keep the high intensity light flashing until such time as the ignition is turned off.

At this point it should be appropriate to discuss the manner in which the vehicle identification device is kept from being disabled so that the identification number continues to be generated. One method would be to equip law enforcement officials, as well as possibly Base Stations generally, with frequency generators which are capable of transmitting a Frequency C whereby the law enforcement official can check the operation of the vehicle's system. By generating a Frequency C, the high intensity light would flash and the operation could be checked. Since it is necessary for the official to de-energize the high intensity light, provision has been made for the law enforcement official to be equipped with a Frequency A Generator as well as an Enable Signal Generator. By transmitting both frequencies together, controlled diode 104 will be energized by the Enable Signal from Enable Signal Detector 24. A controlled diode 106 will be energized by the signal emanating from the Frequency A Detector 22. This will energize relay F4. The energization of relay F4 will open the normally closed contact to F4-1 in the line between relay F3 and ground. This will, of course, open the contact F3-1 and F3-2, thus de-energizing the high intensity flashing light.

In operation it will therefore be seen that the vehicle will transmit its Enable Signal and its identification number which will be picked up at a Base Station No. 2 type device. The Enable Signal will energize the Dynamic Registers 92 over line C, and the identification number will be fed into the AND circuits 94. If there is a match, the Frequency C Generator 100 will send a signal over line F to the transmitter 14'. This Frequency C will be picked up on the mobile receivers 16, and through the Frequency C Detector 102 will energize a relay F3, thus turning on the flashing high intensity light HI. Checking of the device can be done by a law enforcement official generating a Frequency C, and de-energization may be done by transmitting both an Enable Signal and a Frequency A to energize the relay F4 through controlled diodes 104, 106, thus opening the contact F4-1 and de-energizing relay F3 and the high intensity light HI.

3. TOLL STATION

For purposes of description of a toll station, reference need only be made to Base Station No. 2 (FIG. 3), the Mobile Receiver/Transmitter (FIG. 1) and the toll Station Recorder in FIG. 5. The same operation is used for parking lots.

The toll station will be transmitting a Frequency A over generator 10' through a transmitting antenna 14'. The Mobile Receiver/Transmitter will receive the Frequency A through antenna 16, be amplified by the RF amplifier 18 and be detected by the Frequency A Detector 22, going through the same process as the speed control system. An Enable Signal and its vehicle's identification number (0–9) will be sent out over the mobile transmitter 44. The identification number and the Enable Signal will be received by Base Station No. 2. The Enable Signal will go through terminal C after passing through the pulse shaper 60' and energize an Alarm Prevent system 80. The Alarm Prevent will, as its name implies, prevent an alarm from going off as the vehicle passes through the toll station. Thus, the Enable Signal is used to indicate to the toll station that an authorized vehicle is passing through. The identification number will be recorded on a recorder 82. Also recorded on the recorder will be the time and station identification through appropriate means 84. Further, other information such as the charges can also be placed on the recorder for purposes of later billing.

If the vehicle is not equipped with the proper device to energize the Alarm Prevent 80, an alarm will sound thus calling attention to the fact that an unauthorized vehicle was passing through the toll gate.

The same principle can be used for entry into limited access facilities such as military reservations, except that the vehicle identification number is compared by a computer with a listing of vehicle numbers which are permitted access. If the vehicle is not permitted access, an alarm will sound and a Frequency C (stolen car frequency) will be transmitted, as in the stolen car identification system.

4. EMERGENCY SIGNALLING

Each vehicle will be provided with an emergency signal on the recorder 36 and an emergency switch ES of the impact or inertia type. When the emergency switch ES is closed due to an impact or other means which would energize the condition responsive switch, relay F6 will close, thus closing contact F6-3 and opening contacts F6-1 and F6-2. This will open the circuit to the Clear Detector 48. The emergency signal will be transmitted through contact F5-2 continuously over the transmitting antenna 44. Any other vehicle within the appropriate distance will pick up the emergency signal over its receiving antenna 16 and be detected on an Emergency Signal Detector 110 which is also connected to line 20. The Emergency Signal Detector will gate on a controlled diode 112 bringing in a relay F1 which in turn closes contact F1-1 latching it on. The relay F1 will then also close a contact F1-2 energizing a red flashing light R which is held in the flashing condition by a thermal timer switch TH2. This warns the driver of an accident or other emergency.

After the driver determines the type of emergency, the flashing red light can be de-energized by opening normally closed switch SW1 in the same manner as discussed above with the Frequency B detector 74.

It should be pointed out that there need not be any Frequency A signal in use with the device to cause an emergency signal to be generated by the vehicle. This is because the emergency switch ES bringing in relay F6 breaks the normally closed contact F6-2 in the Inhibitor 12 negative terminal which allows the inhibit circuit to rise to a positive level to give the same result as if the Frequency A had been detected. The Pulse Sequence Detector 34 will be turned on, thereby energizing relay F5 and setting the device into a continuous transmit mode.

An emergency signal can also be transmitted from the Base Stations and received by the vehicle. This would normally occurr in those instances where the speed of the vehicle was causing a danger to that vehicle. In this case both Frequency B, which warns of excessive speed and the emergency signal which warns of an emergency, would be transmitted, energizing both the R and Y lights thus warning the driver to slow his vehicle.

5. VEHICLE AND DRIVER CONDITION DETECTION

A condition which may be monitored is whether or not the vehicle is polluting the air by the emission of a predetermined amount of noxious gases. A condition sensor 120 which may be a "sniffer" type is positioned to detect exhaust gases. When a predetermined level of undesirable gases exceeds the pollution level permitted, a controlled diode 122 will be gated on. When the Clear Signal is detected through Clear Signal Detector 48, a second controlled diode 124 will be gated on. Therefore, the current will flow to a Clear Signal Modulator 126 which will modulate the Clear Signal as it comes through the amplifier/modulator 46. This modulation will be such that it will indicate that thevehicle is exceeding the pollution level, and this indication will be recorded along with the vehicle identification number so that further action can be taken. For example, when it passes a Base Station and is recorded, an appropriate signal can be sent back to the driver in the manner discussed with the other signal lights R and Y, for example. Also the information can be recorded in the same manner as the toll station device and a notice be sent out, etc.

In a like manner, other driver or vehicle conditions such as vehicle maintenance, driver intoxication, seat belt fastening, and actual speed determined by the speedometer may be monitored by using various sensors in the position of sensor 120. Any of these sensed conditions will modulate a Clear frequency through the Clear Signal Modulator 126, amplified and modulated at 46, and then sent out over transmitter 44. This information then comes into the Base Station No. 1 with the Enable Signal and identification number. The signal passes through the RF Amplifier 54. The information modulated at 126 (FIG. 1) passes through the Clear Signal Detector 64 and Clear Pulse Shaper 66 over line 67 to a Driver Vehicle Demodulator 71. All of the information is recorded at Condition Recorder 73. This information includes the condition coming from the demodulator 71 and the Enable Signal and identification number which is tapped off terminal B.

It will be understood that there are numerous methods of generating the identification number other than recording the various digits on a magnetic tape. Another method includes having a series of signal generators wherein the generated signals are connected to a prewired circuit board set up to represent a particular number of, for example, nine digits. Another method utilizes a solid state binary transmitter which transmits a binary code directly rather than conversion at the receiver.

While the invention has been described, it will be understood that it is capable of further modifications and this application is intended to cover any variations, uses or adaptations of the invention following in general the principles of the invention and including such departures from the present disclosure as come within known or customary practice in the art to which the invention pertains, and as may be applied to the essential features hereinbefore set forth and as fall within the scope of the invention or the limits of the appended claims.

I claim:

1. A vehicle identification system comprising:
   a. a station exterior of the vehicle including means for generating an inquiring signal,
   b. a mobile transmitter and receiver system in the vehicle including:
      1. means for generating an enabling signal,
      2. means for actively generating a given identification signal,
      3. means for receiving said inquiring signal from the exterior station,
      4. means for detecting an enabling signal from another vehicle,
   whereby the identification signal and the enabling signal are generated by the mobile transmitter upon receiving an inquiring signal from the exterior station if no enabling signal is detected from another vehicle.

2. A vehicle identification system as defined in claim 1 including a second station positioned a distance from said first mentioned station, and means at said second station for recording said identification signal if the vehicle travels between said two stations faster than a predetermined time.

3. A vehicle identification system as defined in claim 2 including means for generating a speeding signal if said identification signal is recorded, and means in the vehicle for detecting said speeding signal.

4. A vehicle identification system as defined in claim 1 including means at said station for storing a series of identification numbers, and means for comparing said given identification number with said series of identification numbers.

5. A vehicle identification system as defined in claim 4 including means at said station for generating an energizing signal, means in the vehicle for detecting said energizing signal, and means responsive to said energizing signal detecting means for providing an indication on said vehicle, but exterior thereto.

6. A vehicle identification system as defined in claim 1 including an alarm at said station and means responsive to said enabling signal for preventing the energization of said alarm.

7. A vehicle identification system as defined in claim 1 including means at said station for recording said identification signal.

8. A vehicle identification system as defined in claim 7 including means for recording other data together with said identification signal.

9. A vehicle identification system as defined in claim 1 including a condition responsive sensing means in the vehicle, means for generating a condition signal upon the actuation of said condition responsive means.

10. A vehicle identification system as defined in claim 9 including means in the vehicle for detecting that a condition signal is being generated by a condition generating means other than the vehicle's own condition generating means.

* * * * *